(12) United States Patent
Lee et al.

(10) Patent No.: US 10,489,051 B2
(45) Date of Patent: Nov. 26, 2019

(54) HANDWRITING INPUT APPARATUS AND CONTROL METHOD THEREOF

(71) Applicant: SAMSUNG ELECTRONICS CO., LTD., Suwon-si (KR)

(72) Inventors: Dong-hyuk Lee, Seoul (KR); Do-hyeon Kim, Suwon-si (KR); Sang-ho Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 14/818,426

(22) Filed: Aug. 5, 2015

(65) Prior Publication Data

US 2016/0154579 A1 Jun. 2, 2016

Related U.S. Application Data

(60) Provisional application No. 62/085,366, filed on Nov. 28, 2014.

(30) Foreign Application Priority Data

Feb. 6, 2015 (KR) .................. 10-2015-0018602

(51) Int. Cl.
*G06K 9/00* (2006.01)
*G06F 3/0488* (2013.01)
*G06F 3/0484* (2013.01)

(52) U.S. Cl.
CPC ...... *G06F 3/04883* (2013.01); *G06F 3/04847* (2013.01); *G06K 9/00335* (2013.01); *G06K 9/00402* (2013.01)

(58) Field of Classification Search
CPC ............ G06F 3/04883; G06F 3/04847; G06K 9/00335; G06K 9/00402
See application file for complete search history.

(56) References Cited

U.S. PATENT DOCUMENTS 4,440,513 A * 4/1984 Kataoka .................. G06F 3/018
345/173
4,727,588 A * 2/1988 Fox ......................... G06K 9/222
345/173

(Continued)

FOREIGN PATENT DOCUMENTS

| EP | 2613228 A1 | 7/2013 |
| KR | 10-2013-0080515 A | 7/2013 |
| KR | 10-2014-0089915 A | 7/2014 |

OTHER PUBLICATIONS

Communication dated Jul. 12, 2019, issued by the Korean Intellectual Property Office in counterpart Korean Application No. 10-2015-0018602.

*Primary Examiner* — Aaron W Carter
(74) *Attorney, Agent, or Firm* — Sughrue Mion, PLLC

(57) ABSTRACT

A handwriting input apparatus and method are provided. The handwriting input apparatus includes a touch screen configured to display handwriting input by a touch input, and a processor configured to recognize a text corresponding to the handwriting, divide the handwriting into a plurality of handwriting segments based on the recognized text and a predetermined edit unit size, and edit the handwriting based on the plurality of handwriting segments in response to receiving a user command.

14 Claims, 33 Drawing Sheets

OVERLAY WRITE

ARRANGE AFTER SUBSTITUTING EDITED DATA

(56) References Cited

U.S. PATENT DOCUMENTS

| | | | | |
|---|---|---|---|---|
| 4,827,588 A * | 5/1989 | Meyer | B23P 15/006 | 29/463 |
| 5,513,278 A * | 4/1996 | Hashizume | G06F 3/04883 | 345/467 |
| 5,698,822 A * | 12/1997 | Haneda | G06F 3/04883 | 178/18.01 |
| 5,912,986 A * | 6/1999 | Shustorovich | G06K 9/32 | 382/156 |
| 6,317,762 B1 * | 11/2001 | Okawa | G06T 11/60 | 382/187 |
| 7,502,017 B1 * | 3/2009 | Ratzlaff | G06F 3/04883 | 345/173 |
| 2003/0007018 A1 * | 1/2003 | Seni | G06F 3/0237 | 715/864 |
| 2003/0053084 A1 * | 3/2003 | Geidl | G06F 17/24 | 358/1.6 |
| 2004/0096105 A1 * | 5/2004 | Holtsberg | G06K 9/222 | 382/186 |
| 2005/0183005 A1 * | 8/2005 | Denoue | G06F 17/241 | 715/202 |
| 2007/0260981 A1 * | 11/2007 | Kim | G06F 3/04812 | 715/256 |
| 2009/0116744 A1 * | 5/2009 | Woo | G06K 9/222 | 382/187 |
| 2011/0157028 A1 * | 6/2011 | Stallings | G06F 3/04883 | 345/173 |
| 2011/0181619 A1 * | 7/2011 | Kwon | H04M 1/72555 | 345/629 |
| 2011/0183691 A1 * | 7/2011 | Kwon | H04M 1/72555 | 455/466 |
| 2011/0255100 A1 * | 10/2011 | De Munck | B41J 3/4075 | 358/1.6 |
| 2012/0027302 A1 * | 2/2012 | Khushboo | G06K 9/00865 | 382/186 |
| 2012/0293423 A1 * | 11/2012 | Dai | G06F 3/018 | 345/173 |
| 2012/0293424 A1 * | 11/2012 | Dai | G06F 3/018 | 345/173 |
| 2012/0308127 A1 * | 12/2012 | Kudoh | G06K 9/4652 | 382/165 |
| 2012/0327105 A1 * | 12/2012 | Rowley | G06F 3/04883 | 345/619 |
| 2013/0085743 A1 * | 4/2013 | Koo | G06F 3/0237 | 704/3 |
| 2013/0147809 A1 * | 6/2013 | Luo | G09G 5/28 | 345/472.3 |
| 2013/0179778 A1 * | 7/2013 | Lee | G06F 17/24 | 715/256 |
| 2013/0307861 A1 * | 11/2013 | Lang | G06F 3/04883 | 345/582 |
| 2013/0343639 A1 * | 12/2013 | Benko | G06T 11/60 | 382/155 |
| 2014/0015755 A1 * | 1/2014 | Hao | G06F 3/0416 | 345/168 |
| 2014/0015776 A1 * | 1/2014 | Kim | G06F 3/03545 | 345/173 |
| 2014/0019905 A1 * | 1/2014 | Kim | G06F 9/451 | 715/780 |
| 2014/0085215 A1 * | 3/2014 | Och | G06F 3/04883 | 345/173 |
| 2014/0098047 A1 * | 4/2014 | Son | G06F 3/0488 | 345/173 |
| 2014/0270529 A1 * | 9/2014 | Sugiura | G06F 3/04883 | 382/189 |
| 2014/0292702 A1 * | 10/2014 | Samejima | G06F 3/04883 | 345/173 |
| 2014/0334732 A1 * | 11/2014 | Jung | G06F 3/04883 | 382/188 |
| 2014/0337720 A1 * | 11/2014 | Park | G06F 3/04842 | 715/268 |
| 2014/0363082 A1 * | 12/2014 | Dixon | G06K 9/00402 | 382/187 |
| 2014/0368453 A1 * | 12/2014 | Yamaguchi | G06F 3/04883 | 345/173 |
| 2015/0058718 A1 * | 2/2015 | Kim | G06F 3/04883 | 715/268 |
| 2015/0135065 A1 * | 5/2015 | Hirabayashi | G06F 3/0237 | 715/261 |
| 2015/0135115 A1 * | 5/2015 | Feng | G06F 3/04883 | 715/771 |
| 2015/0242114 A1 * | 8/2015 | Hirabayashi | G06F 3/04883 | 345/156 |
| 2015/0269432 A1 * | 9/2015 | Motoi | G06K 9/222 | 382/189 |
| 2015/0347001 A1 * | 12/2015 | Motoi | G06K 9/222 | 345/173 |
| 2015/0379336 A1 * | 12/2015 | Hoshi | G06K 9/00429 | 382/187 |
| 2016/0048324 A1 * | 2/2016 | Fukui | G06F 3/04883 | 715/268 |
| 2016/0062634 A1 * | 3/2016 | Kurita | G06F 17/242 | 715/268 |
| 2016/0132232 A1 * | 5/2016 | Baba | G06K 9/00402 | 715/268 |
| 2016/0132478 A1 * | 5/2016 | Jung | G06F 17/241 | 715/225 |
| 2016/0140387 A1 * | 5/2016 | Sugiura | G06F 3/04883 | 382/189 |
| 2016/0147723 A1 * | 5/2016 | Lee | G06F 3/04883 | 715/268 |
| 2016/0154579 A1 * | 6/2016 | Lee | G06F 3/04883 | 382/189 |
| 2016/0154580 A1 * | 6/2016 | Hirabayashi | G06F 3/04883 | 715/268 |
| 2016/0154997 A1 * | 6/2016 | Kim | G06F 3/04883 | 382/189 |
| 2016/0162175 A1 * | 6/2016 | Terunuma | G06F 3/0233 | 345/173 |
| 2016/0180160 A1 * | 6/2016 | VanBlon | G06F 3/04883 | 382/189 |
| 2016/0321238 A1 * | 11/2016 | Kurita | G06F 17/276 | |
| 2017/0068448 A1 * | 3/2017 | Ghassabian | G06F 3/04886 | |

* cited by examiner

FIG. 2B

Wishing till my last to suffer not a blot of shame
On looking up to heaven
My heart has been tormented by mere rustings of the leaves
In a spirit of chanting stars
I shall love all the moribund lives (a)

Wishing till my last to suffer not a blot of shame
On looking up to heaven
My heart has been tormented by mere rustings of the leaves
In a spirit of chanting stars
I shall love all the moribund lives (b)

Summarizing the fomula the fomula becomes y=ax+b Thus, the condition is satisfied in the case of a=2, b=3 ~32  Summarizing the fomula the fomula becomes y=ax+b Thus, the condition is satisfied in the case of a=2, b=3

PEN TYPE OPTION PREVIEW
WHEN HOVERING PEN

OVERLAY WRITE

ARRANGE AFTER SUBSTITUTING EDITED DATA

MOVE SELECTED DATA

POSITION N FIFTH LINE OF SELECTED DATA.
AND AUTOMATICALLY ARRANGE DESCRIPTIONS ON NEXT LINES

FIG. 12

Wishing till my last to suffer not a blot of shame
On looking up to heaven
My heart has been tormented by mere rustings of the leaves
In a spirit of chanting stars
I shall love all the moribund lives

1201

⬇ DRAG AND SELECT

Wishing till my last to suffer not a blot of shame
On looking up to [SELECT ALL] [CUT] [COPY] [CLIP BOARD] ~1202
My heart has been tormented by mere rustings of the leaves
In a spirit of chanting stars
I shall love all the moribund lives

MENU EXAMPLES

| CUT | COPY | DELETE | CLIP BOARD | ADD ITEM |

1202

⬇

Wishing till my last to suffer not a blot of shame
On looking up to heaven
My heart has been tormented by mere rustings of the leaves
In a spirit of chanting stars ~~Wishing till my last to suffer not a blot of shame On looking up~~
I shall love all the moribund lives

1203 DRAG AND PASTE ON BLANK

FIG. 14B
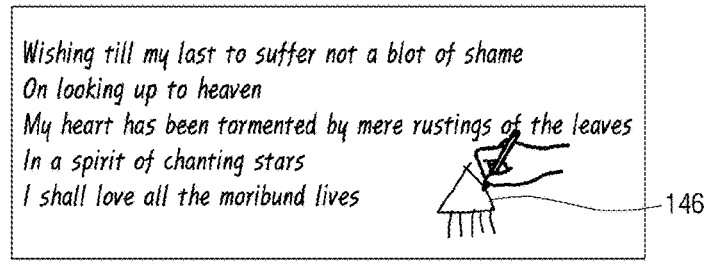
INPUT SYMBOL
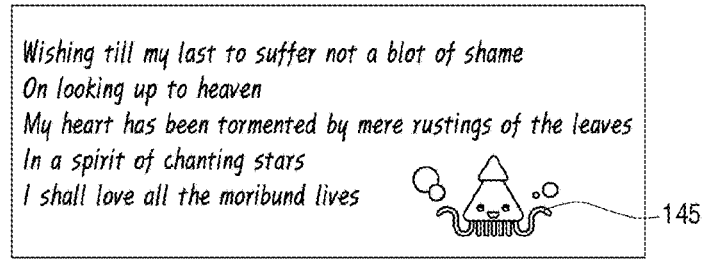

CREATE TEXT BOX AFTER INPUTTING HANDWRITING

TEXT BOX CHARACTER/WORD WRAPPING

FIG. 19B

| Element | Periodic Table No. | Property |
|---|---|---|
| Hydrogen | 1 | Lightest a large amount |
| Carbon | 6 | Basic element |
| Oxygen | 8 | Generate oxide |

ADDITIONALLY INPUT
/DELETE HANDWRITING

| Element | Periodic Table No. | Property |
|---|---|---|
| Hydrogen | 1 | Lightest a large amount |
| Carbon | 6 | Basic element |
| Oxygen | 8 | Generate oxide |

AUTOMATICALLY ADJUST CELL
SIZE AND WHOLE TABLE SIZE

| Element | Periodic Table No. | Property |
|---|---|---|
| Hydrogen | 1 | Lightest |
| Carbon | 6 | Basic element |
| Oxygen | 8 | Generate oxide |

➡

| Element | Periodic Table No. | Property |
|---|---|---|
| Hydrogen | 1 | Lightest |
| Carbon | 6 | Basic element |
| Oxygen | 8 | Generate oxide |

ADJUST VERTICAL LINE
POSITION OF TABLE

SELL UNIT CHARACTER
/WORD QRAPPING

HANDWRITING INPUT APPARATUS AND CONTROL METHOD THEREOF

CROSS-REFERENCE TO RELATED APPLICATIONS

This application claims benefit of U.S. Provisional Patent Application No. 62/085,366, filed on Nov. 28, 2014, in the United States Patent and Trademark Office, and priority from Korean Patent Application No. 10-2015-0018602, filed on Feb. 6, 2015, in the Korean Intellectual Property Office, the disclosures of which are incorporated herein by reference in their entireties.

BACKGROUND

1. Field

Apparatuses and methods consistent with exemplary embodiments relate to a handwriting input apparatus and a control method thereof, and more specifically, to a handwriting input apparatus and method that are configured to write or edit documents through handwriting input on a touch screen.

2. Description of Related Art

As the tablet personal computers (PCs), smart phones and other mobile terminals have become widely used, user demand for intuitive input or output of information through handwriting input by a touch input has increased. For example, many mobile terminals are beginning to use a touch screen and an intuitive user interface (UI) method in which information is input by a finger or a touch pen for various user inputs.

Handwriting input-based methods provide users with a higher degree of freedom in creating memos, messages, general documents, etc., as well as a more intuitive and/or quicker input than document writing methods through a keyboard input.

However, in the related art, handwriting created according to handwriting input-based methods are typically processed as image files, or converted and processed into text files through handwriting recognition. Thus, as compared to a case in which text is input as characters (e.g., through a keyboard or the like), it is difficult to edit the handwriting.

Therefore, there is a need for a method with which a handwriting input apparatus can implement a document editing experience that is similar to a keyboard input-based document writing method.

SUMMARY

Exemplary embodiments address at least the above disadvantages and other disadvantages not described above. Also, one or more of the exemplary embodiments are not required to overcome the disadvantages described above, and an exemplary embodiment of the present inventive concept may not overcome any of the problems described above.

According to an aspect of an exemplary embodiment, there is provided a handwriting input apparatus, including: a touch screen configured to display handwriting input by a touch input; and a processor configured to recognize a text corresponding to the handwriting, divide the handwriting into a plurality of handwriting segments based on the recognized text and a predetermined edit unit size, and edit the handwriting based on the plurality of handwriting segments in response to receiving a user command.

The processor may be further configured to select an edit area in an area in which the handwriting is displayed, based on the predetermined edit unit size, in response to receiving a user command to select the edit area.

In response to receiving a size change command to change a size of the handwriting included in the selected edit area, the processor may be further configured to determine the size of the handwriting based on the handwriting segments included in the selected edit area and adjust the size of the handwriting included in the selected edit area based on the handwriting segments.

In response to receiving a line interval change command to change a line interval between the handwriting included in the selected edit area, the processor may be further configured to determine the line interval between the handwriting based on the handwriting segments included in the selected edit area and adjust the line interval between the handwriting included in the selected edit area based on the handwriting segments.

In response to receiving new handwriting on the selected edit area, the processor may be further configured to substitute the new handwriting for the handwriting included in the selected edit area, and rearrange the area in which the handwriting is displayed based on the predetermined edit unit size and the substituted handwriting.

In response to receiving a handwriting move command to move a position of the handwriting included in the selected edit area to another area in the area in which the handwriting is displayed, the processor may be further configured to move the position of the handwriting included in the selected edit area according to the handwriting move command, and rearrange an order of the handwriting in the area in which the handwriting is displayed based on the predetermined edit unit size and the moved position of the handwriting.

The processor may be further configured to create a text box on the selected edit area, and edit the text box based on the predetermined edit unit size, in response to receiving a user command corresponding to the text box.

In response to receiving a table create command corresponding to the selected edit area, the processor may be further configured to analyze rows and columns to divide the handwriting included in the selected edit area based on the handwriting segments included in the selected edit area and create a table in which the handwriting included in the selected edit area is divided into the rows and the columns based on the analyzed results.

In response to receiving a user command to adjust a size of an input window in which the handwriting is displayed, the processor may be further configured to rearrange the handwriting based on the predetermined edit unit size and the adjusted size of the input window.

The predetermined edit unit size may be one character or one word of text.

According to an aspect of another exemplary embodiment, there is provided a control method of a handwriting input apparatus, including: recognizing a text corresponding to handwriting input by a touch input and displayed on a touch screen; dividing the handwriting into a plurality of handwriting segments based on the recognized text and a predetermined edit unit size; and editing the handwriting based on the plurality of handwriting segments, in response to a user command.

In response to the user command being a command to select an edit area in an area in which the handwriting is displayed, the editing may include selecting the edit area based on the predetermined edit unit size.

In response to receiving a size change command to change a size of the handwriting included in the selected edit area, the editing may further include determining the size of the handwriting based on the handwriting segments included in the selected edit area, and adjusting the size of the handwriting included in the selected edit area based on the handwriting segments.

In response to receiving a line interval change command to change a line interval between the handwriting included in the selected edit area, the editing may further include determining the line interval between the handwriting based on the handwriting segments included in the selected edit area, and adjusting the line interval between the handwriting included in the selected edit area based on the handwriting segments.

In response to receiving new handwriting on the selected edit area, the editing may further include substituting the new handwriting for the handwriting included in the selected edit area, and rearranging the area in which the handwriting is displayed based on the predetermined edit unit size and the substituted handwriting.

In response to receiving a handwriting move command to move a position of the handwriting included in the selected edit area to another area in the area in which the handwriting is displayed, the editing may further include moving the position of the handwriting included in the selected edit area according to the handwriting move command, and rearranging an order of the handwriting in the area in which the handwriting is displayed based on the predetermined edit unit size and the moved position of the handwriting.

The editing may further include creating a text box in the selected edit area, and editing the text box based on the predetermined edit unit size, in response to receiving a user command corresponding to the text box.

In response to receiving a table create command corresponding to the selected edit area, the editing may further include analyzing rows and columns to divide the handwriting included in the selected edit area based on the handwriting segments included in the selected edit area, and creating a table in which the handwriting included in the selected edit area is divided into the rows and the columns based on the analyzed results.

In response to receiving a user command is to adjust size of an input window in which the handwriting is displayed, the editing may further include rearranging the handwriting based on the predetermined edit unit size and the adjusted size of the input window.

The predetermined edit unit size may be one character or one word of text.

According to an aspect of another exemplary embodiment, there is provided a device including: a display configured to display handwriting drawn by a touch input; and at least one processor configured perform text recognition on the handwriting to determine text corresponding to the handwriting, segment the handwriting into a plurality of handwriting segments based on the determined text and a selected segment size of a plurality of predetermined segment sizes, and edit the handwriting based on the selected segment size, in response to receiving a command input by a touch input.

The processor may be further configured to select a portion of the handwriting based on the selected segment size, in response to receiving a selection command input by a touch input.

The processor may be further configured to change a size of the selected portion of the handwriting or change a line interval between the selected portion of the handwriting, based on the plurality of handwriting segments corresponding to the selected portion of the handwriting, in response to receiving a corresponding one of a change of size command or a change of line interval command input by a touch input.

The plurality of predetermined segment sizes may include a size corresponding to one letter of text and a size corresponding to one character of text.

According to one or more of the exemplary embodiments, user convenience may be increased because a user can write and edit document by a handwriting input, while still keeping advantages of keyboard inputting-based document writing and editing.

BRIEF DESCRIPTION OF THE DRAWINGS

The above and/or other aspects will be more apparent by describing certain exemplary embodiments with reference to the accompanying drawings, in which:

FIG. 2B is a diagram illustrating an example of a method of selecting an edit area according to an exemplary embodiment.

FIG. 12 is a diagram illustrating an example of a method of copying and pasting handwriting on an edit area according to an exemplary embodiment;

FIGS. 14A and 14B are diagrams illustrating examples of a method of inputting registered objects according to an exemplary embodiment;

FIGS. 19A-C to 20A-B are diagrams illustrating examples of a method of editing a table according to an exemplary embodiment;

DETAILED DESCRIPTION

Figure 1:
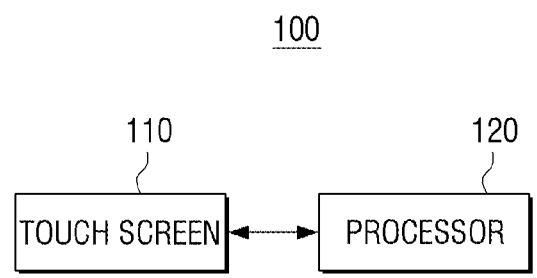
FIG. 1 is a schematic block diagram of a handwriting input apparatus according to an exemplary embodiment.

Certain exemplary embodiments will now be described in greater detail with reference to the accompanying drawings.

In the following description, same drawing reference numerals are used for the same elements, even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a schematic block diagram of a handwriting input apparatus according to an exemplary embodiment.

Referring to FIG. 1, the handwriting input apparatus 100 according to an exemplary embodiment includes a touch screen 110 and a processor 120.

The handwriting input apparatus 100 may be implemented as a smart phone, a mobile phone, a portable multimedia player (PMP), an MP3 player, a tablet PC, a personal navigation device, and the like, each including a touch screen to which handwriting inputting is enabled with a touch input by a user.

For convenience, certain exemplary embodiments are described herein by assuming a case in which the handwriting input apparatus 100 is implemented as a smart phone. However, this is only exemplary, and the handwriting input apparatus 100 may be implemented as various devices having touch screen, in addition to the above-mentioned devices.

The touch screen 110 is configured to receive handwriting input with a finger or a touch pen and display the same. For example, the touch screen 110 may include a display panel for displaying information output from the handwriting input apparatus 100 and an input sensing panel for sensing various input functions by a user.

The display panel may include liquid crystal display (LCD) or organic light emitting diodes (OLED), which may be implemented by being structurally integrated with the input sensing panel. The display panel may further include a handwriting screen of the handwriting input apparatus 100, and display various screens such as operational statuses, menu statuses, application implementing statuses, or services.

The input sensing panel may sense various inputs such as a user's single or multi touch inputs that are input using various objects such as finger or electronic pen, drag inputs, handwriting inputs or drawing inputs. The input sensing panel may be implemented by using one panel that can sense both a finger input and a pen input. Alternatively, the input sensing panel may be implemented by using two panels which include a touch panel configured to sense a finger input and a pen recognizing panel configured to sense a pen input.

The processor 120 is configured to control the overall operation of the handwriting input apparatus 100. For example, the processor 120 may recognize text corresponding to the handwriting input by a user touch input. The processor 120 may extract feature information from the drawn tracks of the handwriting according to the touch input, and recognize characters having uniform or similar feature information as characters corresponding to the handwriting from the extracted feature information. The feature information of the handwriting may include length ratio, angle, direction, relative position information, and the like. Such feature information may be stored in database.

Further, the processor 120 may perform editing, by dividing the handwriting into a plurality of handwriting segments based on an edit unit, based on the text recognition. The edit unit may refer to a minimum unit which can be a basis of editing. Put another way, the edit unit may determine the size of the handwriting segments (i.e., edit unit size) that the handwriting is divided into. For example, the edit unit may be one character or one word. The character may include letter, number, or symbol. The word may indicate a bundle of characters based on the word spacing.

For example, when the handwriting of "my home" is input and when the edit unit is the character, the handwriting may be divided into individual letters. That is, the handwriting may be divided into edit units (i.e., handwriting segments) of "m," "y," "h," "o," "m," "e." Similarly, when the edit unit is the word, the handwriting may be divided into individual words. That is, edit units of "my" and "home."

The processor 120 may edit the handwriting based on the edit unit set by a user in response to a user command. For example, the edit unit (i.e., edit unit size) may be selected from a plurality of predetermined edit units. For example, when the user command is to select at least one area where the handwriting is performed, the processor 120 may select the edit area by dividing the handwriting included in the selected area based on the edit unit. This will be explained in greater detail below with reference to FIGS. 2A and 2B.

Figure 2A:
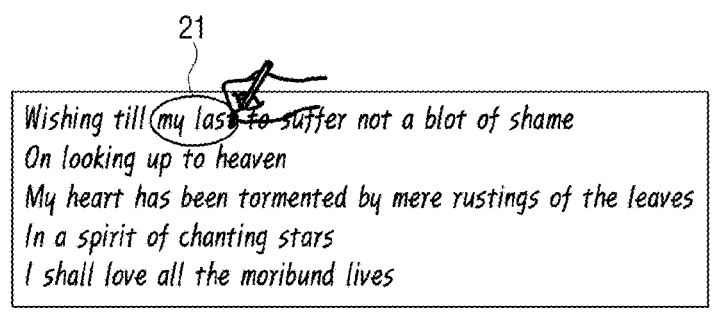
FIG. 2A is a diagram illustrating an example of a method of selecting an edit area according to the related art.

FIG. 2A is a diagram illustrating an example of a method of selecting an edit area according to the related art.

Referring to FIG. 2A, to edit "my last" 21 on the handwriting input screen according to a method of the related art, the edit area may be selected by dragging so as to enclose corresponding characters. However, the accuracy in the selecting of the desired handwriting to edit (i.e., "my last") may be poor because the selecting is performed while the text recognition of characters is not performed.

FIG. 2B is a diagram illustrating an example of a method of selecting an edit area according to an exemplary embodiment.

Illustration (a) of FIG. 2B illustrates an example in which the edit unit is set to be the character. Referring to illustration (a) of FIG. 2B, when a user selects at least one area where the handwriting is performed by dragging, handwriting area 22 including the characters, "t," "i," "l," "l," "m," "y," "l," "a," may be selected on per character basis as the edit area and may be clearly distinguished from the other handwriting areas. The corresponding edit area may be displayed distinguishably from the other handwriting areas by setting a block or applying the highlighting pen effects.

Illustration (b) of FIG. 2B illustrates an example in which the edit unit is set to be the word. Referring to illustration (b) of FIG. 2B, when a user selects at least one area in which the handwriting is performed by dragging, handwriting area 23 including the words, "till," "my" and "last" may be selected on a per word basis as the edit area and may be clearly distinguished from the other handwriting areas.

Thus, because the exemplary embodiment may perform editing by dividing the handwriting based on the edit unit set by a user based on the text recognition, the handwriting may be correctly selected based on the edit unit.

In another example, when a user command is to adjust size of input window where the handwriting is performed, the processor 120 may rearrange the handwriting based on the edit unit, based on the adjusted size of the input window. This will be described in greater detail below with reference to FIGS. 3A to 3C.

Figure 3A:
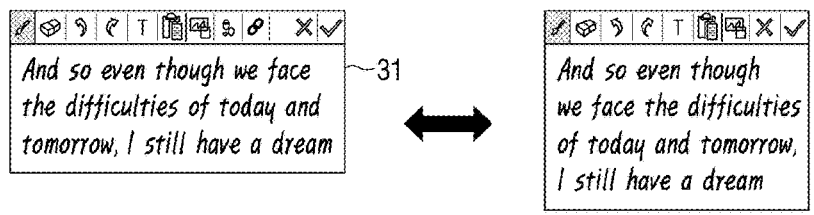
FIGS. 3A to 3C are diagrams illustrating examples of various methods in which handwriting is rearranged in response to adjustment of size of the input window according to an exemplary embodiment.

FIG. 3A illustrates an exemplary embodiment in which the handwriting is rearranged in response to adjustment of the size of the input window.

Referring to FIG. 3A, handwriting inputting may be performed in the input window 31 in which the size displayed on the touch screen 110 can be adjusted. As illustrated in FIG. 3A, the corresponding input window 31 may provide a UI including various edit functions.

When handwriting inputting is performed on the input window 31, it may be desirable that the size or shape of the input window 31 is adjusted according to various utilizing of a user regarding the touch screen 110. For example, when the size or the shape of the input window 31 is adjusted by a user, the handwriting within the input window 31 may be automatically rearranged based on the edit unit based on new size or new shape of the input window 31 according to the adjusted size or the adjusted shape of the input window 31.

For example, the processor 120 may calculate the width of the newly adjusted input window 31, and rearrange the handwriting by line-breaking based on the edit unit corresponding to the calculated width. Accordingly, even when the size or the shape of the input window 31 is adjusted, deterioration which may occur in the readability regarding the input handwriting can be minimized.

Figure 3B:

FIG. 3B illustrates another exemplary embodiment in which the handwriting including a mathematical formula is rearranged in response to adjustment of the size of the input window.

Referring to FIG. 3B, if the handwriting input on the input window 32 includes the formulae which are $y=ax+b$, $a=2$, $b=3$, each formula may be line-broken per one formula unit when the handwriting is line-broken in response to adjustment of the size or the shape of the input window 32.

For example, when the size or the shape of the input window 32 is adjusted, and when one formula of $y=ax+b$ is broken and arranged into another line, the readability of corresponding formula may deteriorate. Thus, even when the edit unit of $y=ax+b$ is the character such as "y," "=," "a," "x," "+," "b," the processor 120 may control to apply the line-breaking of the formula of $y=ax+b$ as one unit so that the formula of $y=ax+b$ is arranged on the same row.

Figure 3C:
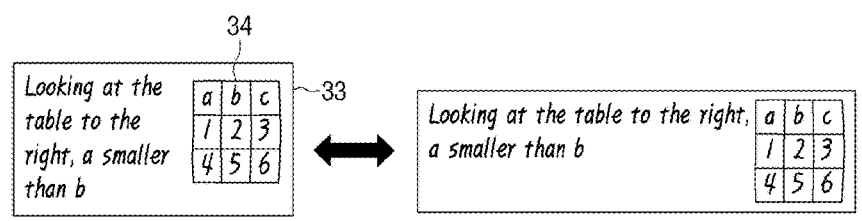

FIG. 3C illustrates another exemplary embodiment in which the handwriting including a table is rearranged in response to adjustment of the size of the input window.

Referring to FIG. 3C, if the input window 33 includes an object (e.g., drawing or table) distinguished from the input handwriting area, the object distinguished from the handwriting area may be rearranged by analyzing the size or the shape of the input window 33 and the position of the input handwriting area when the handwriting is line-broken in response to adjustment of the size or the shape of the input window 33.

For example, as illustrated in FIG. 3C, when the table 34 is included in the input window 33, the input handwriting area may be automatically line-broken in response to increasing width and decreasing height of the input window 33. However, as the table 34 is an object distinguished from the input handwriting area, the line-breaking may not be applied to the table 34, and the table may be rearranged according to the size or the shape of the input window 33 and the position of the input handwriting area.

In another example, when a size change command to change the size of the handwriting included in the edit area is input, the processor 120 may determine the size of the handwriting based on the edit unit, and adjust the size of the handwriting based on the edit unit corresponding to the size change command.

For example, a user may select one area among the areas in which the handwriting is performed, as an edit area to change the size of the handwriting. The processor 120 may extract the minimum enclosing rectangle (MER) enclosing the outer perimeter based on the edit unit in response to the size change command to change the size of the handwriting included in the selected edit area.

For example, when the edit unit is the character, the processor 120 may extract the MER for each character included within the edit area. The processor 120 may calculate font size of each character based on the extracted MER, and adjust the font size of each character corresponding to the font size selected by a user based on the calculated font size of each character. The processor 120 may adjust line interval and set width in the area where the handwriting is performed, while adjusting the font size in the edit area. This will be explained in greater detail below with reference to FIG. 4.

Figure 4:
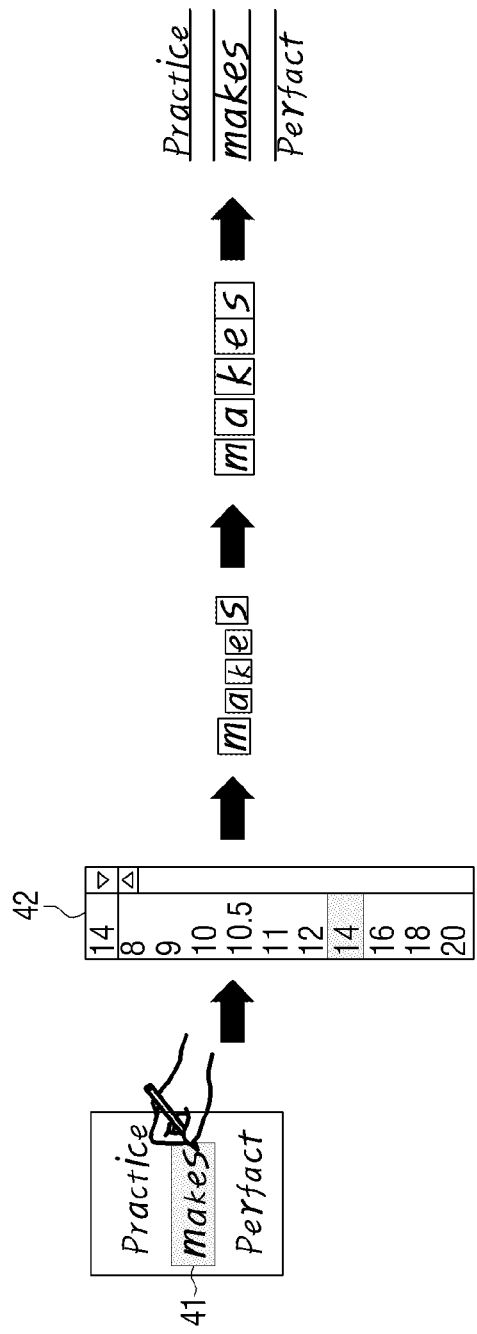
FIG. 4 is a diagram illustrating an example of a method of adjusting size of the handwriting according to an exemplary embodiment.

FIG. 4 is a diagram illustrating an example of a method of adjusting the size of the handwriting according to an exemplary embodiment.

Referring to FIG. 4, by nature, it is difficult to keep the input characters in constant size when inputting the handwriting. Thus, the readability or the visual look of the document having the handwriting input may be poor. According to an exemplary embodiment, a user may change the font size of the characters to be uniform by easily selecting the edit area.

For example, a user may select the edit area 41 where the font size is changed with a dragging method. In this case, the processor 120 may extract the MER on a per character basis regarding the selected edit area 41, and calculate the font size on a per character basis based on the extracted MER. For example, when the font sizes of the characters included in the edit area 41 are different from each other, the processor 120 may estimate and display the minimum font size of the characters within the edit area 41 on font size change UI 42 in which the font size can be changed.

For example, when "e" is estimated to be the character having the minimum font size in the edit area 41 after being calculated based on MER, and when the font size of "e" is 14 pt, the processor 120 may inform a user of this by displaying the representative font size of the characters in the edit area 41 such as "14+."

A user may manipulate the font size change UI 42, and apply the intended font size of 24 pt to the edit area 41. For example, the processor 120 may adjust the size of the MER in each character to be uniform so that each character in the edit area 41 corresponds to the font size selected by a user, 24 pt. According to the adjusted size of MER, the size of each character in the edit area 41 may be changed to be uniform, and the processor 120 may adjust the line interval and the set width so that the edit area 41 does not overlap with the other handwriting areas.

Further, in response to receiving a line interval change command to change the line interval between the handwriting included in the edit area, the processor 120 may determine the line interval between the handwriting based on the edit unit, and adjust the line interval between the handwriting based on the edit unit corresponding to the line interval change command. This will be described in greater detail below with reference to FIG. 5.

Figure 5:
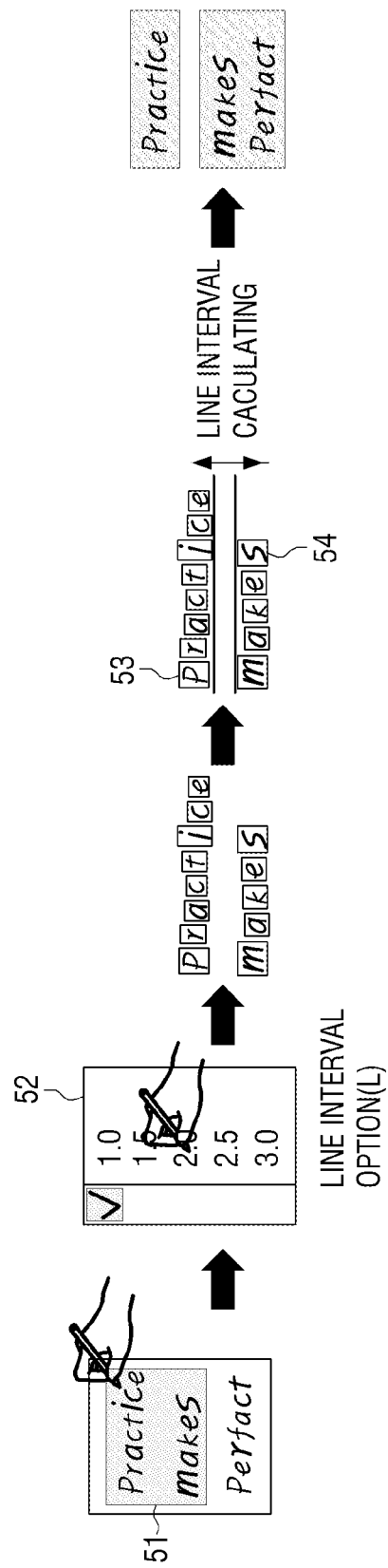
FIG. 5 is a diagram illustrating an example of a method of adjusting line interval between the handwriting according to an exemplary embodiment.

FIG. 5 is a diagram illustrating an example of a method of adjusting the line interval between the handwriting according to an exemplary embodiment.

Referring to FIG. 5, a user may select the handwriting area where the line interval is intended to be adjusted, as an edit area 51. When the edit area 51 is selected, the MER of every character within the edit area 51 may be extracted, the average font size may be calculated, and the line interval may be re-set corresponding to the calculated average font size.

Further, a user may input a line interval change command to change the line interval according to a method of selecting the line interval through the line interval adjusting UI 52.

For example, the processor 120 may extract the MER of each character included in the edit area 51, determine and mark the line interval between the character 53 placed lowest among the characters on the same row (i.e., upper line) and the character 54 placed highest among the characters on the next same row (i.e., line below the upper line), based on the extracted MER. More specifically, the processor 120 may calculate a vertical distance between a base side of the MER of the character 53 placed lowest of the upper line and a top side of the MER of the character 54 placed highest of the next line. Further, the processor 120 may determine the line interval between the upper line and the next line, display and inform the determined line interval to the line interval adjusting UI 52.

When the line interval of the edit area 51 is one time as large as the calculated average font size or larger, the processor 120 may display the line interval such as "1.0+" on the line interval adjusting UI 52, and inform a user.

For example, the processor 120 may adjust the line interval between the characters in response to the line interval change command based on the determined line interval.

Figure 6:
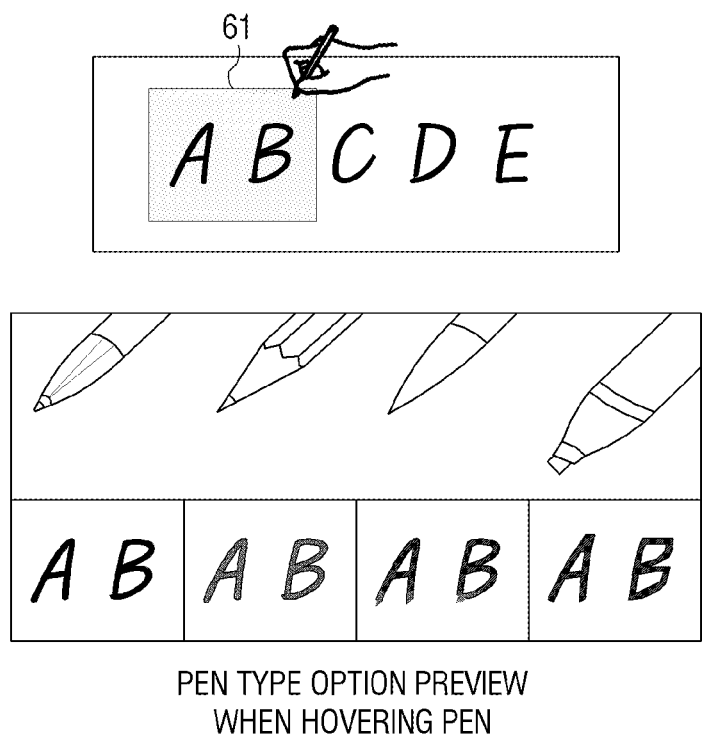
FIGS. 6 to 8 are diagrams illustrating examples of a method of changing handwriting attributes according to various exemplary embodiments.
Figure 7:
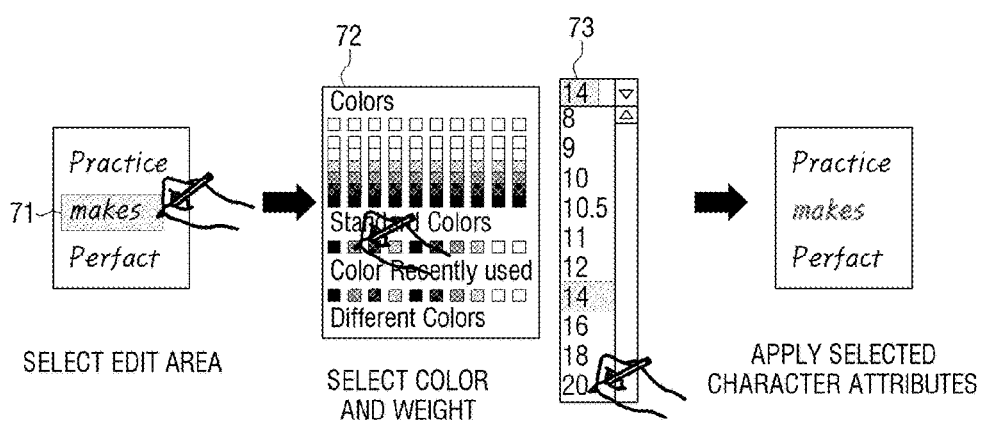
Figure 8:
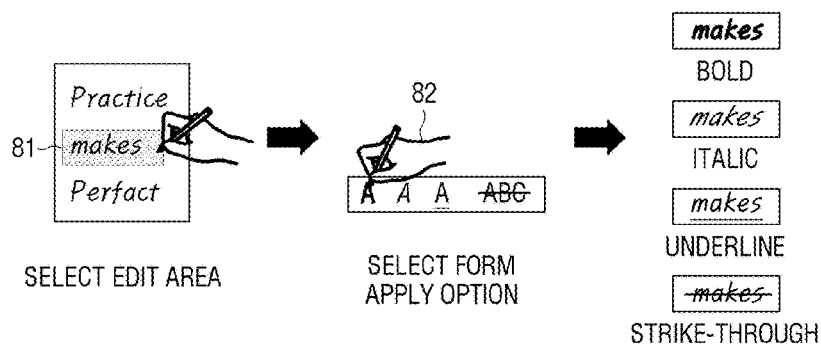

FIGS. 6 to 8 are diagrams illustrating examples of a method of changing the handwriting attributes according to various exemplary embodiments. According to various exemplary embodiments, a user may change the handwriting attributes in the edit area (e.g., color, weight, writing tool, and shape) based on an edit unit.

Referring to FIG. 6, a user may change the handwriting attributes as if the handwriting is input according to a different pen, by selecting the edit area 61 and changing the type of the handwriting pen within the edit area 61. For example, as illustrated in FIG. 6, when a pen is hovered on the edit area 61, the handwriting attributes that may result after changing to the different pen types may be displayed as a preview screen, with a UI in which the pen type can be selected.

Thus, along with the UI providing options to change the handwriting attributes, the processor 120 may display the handwriting attributes that may result after changing when applying with corresponding options, as preview screen. Accordingly, a user may view, in advance, the handwriting attributes after a change, before actually changing the handwriting attributes on the edit area.

Referring to FIG. 7, a user may change the handwriting attributes according to the changed color or the changed weight, by selecting the edit area 71 and changing the color or the weight of the handwriting within the edit area 71. For example, as illustrated in FIG. 7, in response to adjusting the color to red on UI 72 of the edit area 71 in which the color can be changed, and in response to adjusting the weight to be 14 on UI 73 of the edit area 71 in which the weight can be changed, the adjusted color and the adjusted weight may be applied to each character within the selected edit area 71.

Referring to FIG. 8, a user may select the edit area 81 and apply various format changing options to the handwriting within the selected edit area 81. For example, as illustrated in FIG. 8, a user may mark each character of the handwriting within the edit area 81 to be bold or italic by applying the bold option or the italic option to the edit area 81 on UI 82 providing the format changing options.

Further, when the underline option and the strike-through option are applied, the underline or the strike-through may be applied in the italic type to the handwriting within the edit area 81.

Figure 9:
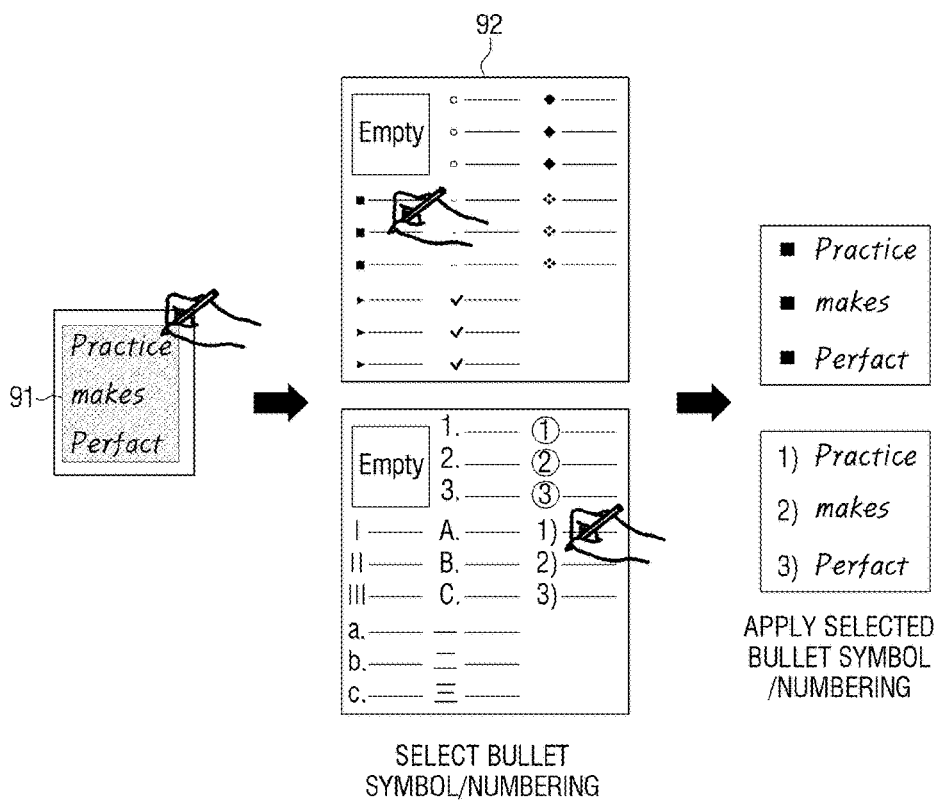
FIGS. 9 and 10 are diagrams illustrating examples of a method of applying bulleting according to an exemplary embodiment.
Figure 10:
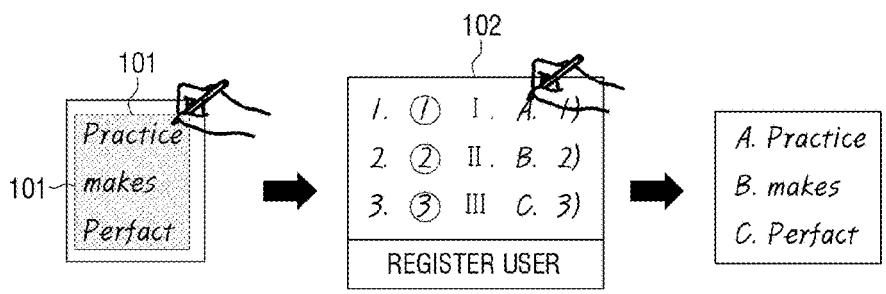

FIGS. 9 and 10 are diagrams illustrating examples of a method of applying a bulleting according to an exemplary embodiment.

Referring to FIG. 9, the bulleting may be applied to the selected edit area 91. Specifically, when the line interval and the average character size within the edit area 91 are calculated and when the bulleting is selected through a UI screen in which bulleting symbols or the bulleting numbers can be applied, the processor 120 may apply the selected bulleting to the edit area 91 based on the line interval and the average character size.

In the above example, the line interval of the edit area 91 may be calculated by extracting the MER of each character included in the edit area 91 and calculating the line interval between the character 53 placed lowest among the characters on the same row (i.e., upper line) and the character 54 placed highest among the characters on the next same row (i.e., line below the upper line), based on the extracted MER.

Further, the average character size of the edit area 91 may be calculated by extracting the MER of each character of the edit area 91 and calculating the font size on a per character basis based on the extracted MER.

Further, referring to FIG. 10, a user may previously register the input bulleting of handwriting inputting and apply the previously registered bulleting to the edit area 101 by selecting the registered bulleting 102. Accordingly, because a bulleting similar to the writing style of the handwriting area can be applied, deterioration in the readability and the visual look may be prevented by enhancing the uniformity or the unity in the writing style.

Further, when new handwriting is input regarding the edit area, the processor 120 may substitute the edit area with the new handwriting, and rearrange the area in which the handwriting is performed into an edit unit based on the substituted handwriting. The above example will be explained in greater detail below with reference to FIGS. 11A and 11B.

Figure 11A:
FIGS. 11A and 11B are diagrams illustrating examples of a method of substituting or moving handwriting on an edit area according to an exemplary embodiment.
Figure 11B:

FIGS. 11A and 11B are diagrams illustrating examples of a method of substituting or moving the handwriting in the edit area according to an exemplary embodiment.

Referring to FIG. 11A, a user may select an edit area 111 to be "my last" and perform editing by overwriting the new handwriting of "death" on the selected edit area 111 according to the overlay method. For example, the processor 120 may substitute "my last" with "death" and rearrange the area in which the handwriting is performed based on the edit unit based on the substituted handwriting. Thus, the processor 120 may remove the blank space generated by the substituted handwriting, and rearrange "till," "death" and "to" at a uniform interval. The rearranged interval may be determined by calculating the average font size of the characters in the area where the handwriting is performed.

FIG. 11B illustrates an exemplary embodiment in which the handwriting of the edit area is moved to another area.

When a handwriting move command to move the position of the handwriting included in the edit area into another area among the areas in which the handwriting is performed to be input, the processor 120 may move the position of the handwriting included in the edit area according to the handwriting move command, and rearrange the order of the handwriting based on the edit unit in the areas in which the handwriting is performed based on the moved position of the handwriting.

For example, referring to FIG. 11B, a user may select the edit area 111 of "my last", and create one line by moving the selected edit area 111 into another area 112 between the fourth line of "In a spirit of chanting stars" and the fifth line of "I shall love all the moribund lives"

In the above example, the processor 120 may rearrange the first line of "Wishing" and "to" by a constant spacing interval, perform the calculating so that the line interval of the area in which the handwriting is performed is constantly narrowed based on the height of the input window, and set the line interval according to the calculation results. Accordingly, when the edit area 111 of "till my last" is moved to corresponding area 112, the handwriting may be automatically arranged according to the constant spacing interval and the set line interval.

FIG. 12 is a diagram illustrating an example of a method of copying and pasting the handwriting of the edit area according to an exemplary embodiment.

Referring to FIG. 12, when a user intends to select the handwriting area of "Wishing till my last to suffer not a blot of shame On looking up" as an edit area among the areas in which the handwriting is performed, the corresponding edit area may be selected by dragging from the beginning part of "Wishing" to the ending part of "up" Thus, a block 1201 may be set on the edit area of "Wishing till my last to suffer not a blot of shame On looking up".

When the block 1201 is set, a UI menu 1202 to select options such as 'paste', 'copy', 'delete', 'clipboard', and 'area add' may be displayed.

When a user intends to copy the edit area, he or she may perform the copying by selecting the copy option on the UI menu 1202. Referring to FIG. 12, pasting may be performed by dragging on the area to be copied. When cutting may be performed regarding the edit area, the edit area in which the cutting is performed may be removed and the area in which the handwriting is performed may be rearranged based on the edit unit while pasting may be simultaneously performed according to the above method.

Figure 13A:
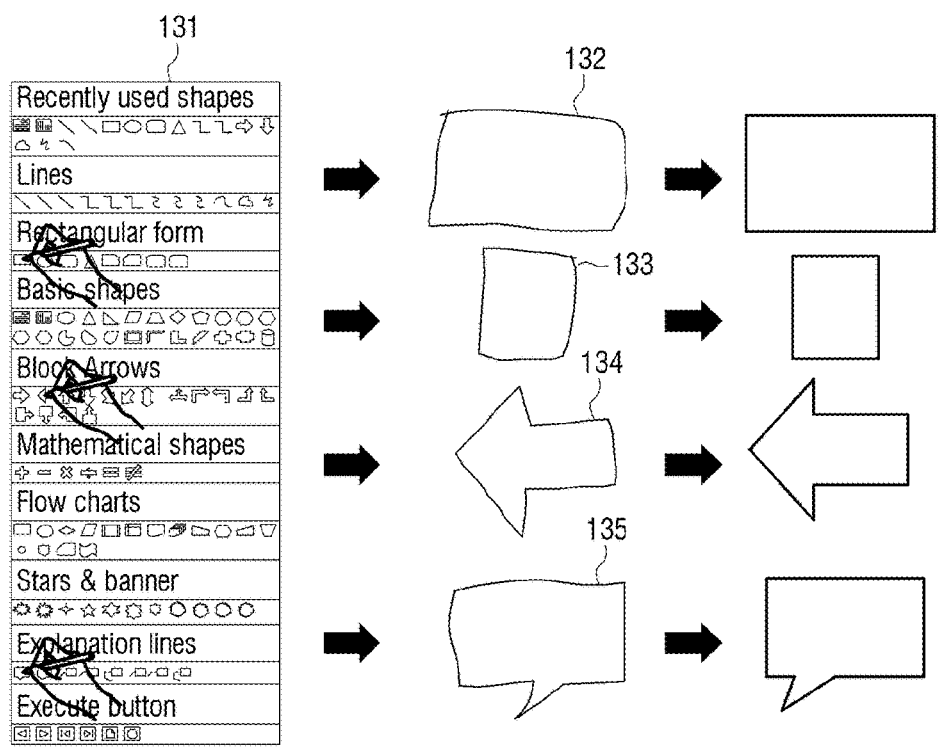
FIGS. 13A and 13B are diagrams illustrating examples of a method of inputting figures according to an exemplary embodiment.
Figure 13B:
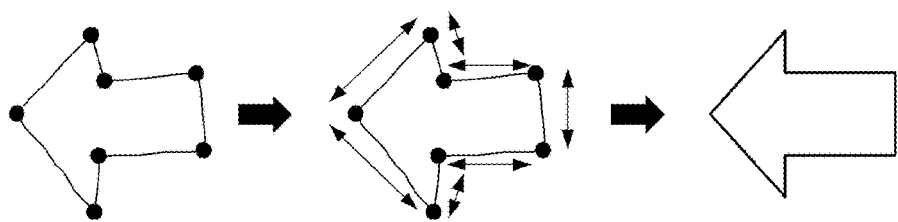

FIGS. 13A and 13B are diagrams illustrating examples of a method of inputting figures according to an exemplary embodiment.

Referring to FIG. 13A, a user may draw a figure, and the figure may be changed into a corrected basic shape that corresponds to the figure drawn by a user.

For example, when a user intends to input a rectangle, he or she may draw the lines for the rectangular figure 132. Further, when a user intends to input a square, he or she may draw the lines for the square figure 133. Thus, he or she may input the basic shape of the rectangular or the square.

Further, as illustrated in FIG. 13A, a user may previously select a figure that he or she intends to draw, on the figure selecting UI 131 in order to enhance the accuracy in recognizing figures. For example, when an arrow is intended to be drawn, a user may first select the arrow shape on the figure selecting UI 131 before actually drawing the arrow 134.

Accordingly, because the processor 120 may first receive the information indicating that the figure drawn by a user is an arrow, the arrow 134 drawn by a user may be changed into a basic arrow shape with some size or shape differences, and may be prevented to be changed into the non-arrow shape such as tetragon.

Likewise, a user may first select the speech balloon figure on the figure selecting UI 131, and draw the speech balloon figure 135. Thus, the basic speech balloon figure having the intended size and shape can be intuitively input.

Referring to FIG. 13B, the basic shape of the arrow may be determined by extracting feature points such as corner point and control point regarding the figure drawn by a user.

For example, the processor 120 may extract the corner point of the figure drawn by a user and adjust the drawing inputting angle. Thereafter, the processor 120 may calculate the average of the symmetric length, and adjust the relative length of the line segments constituting the figure according to the calculated average length. The processor 120 may substitute the drawn arrow figure with the basic arrow figure corresponding to the adjusting results.

Figure 14A:
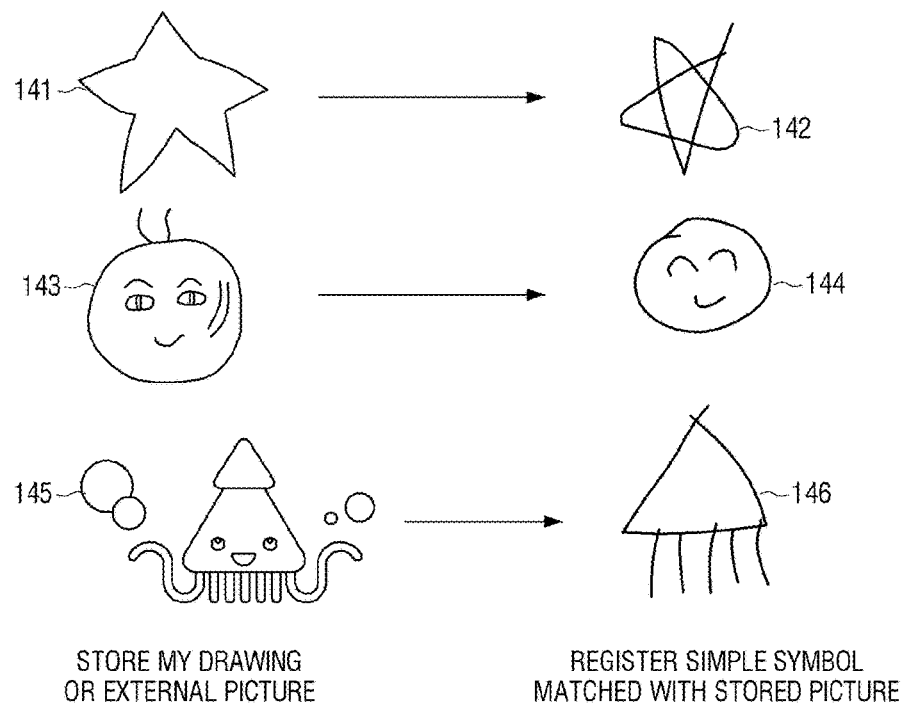

FIGS. 14A and 14B are diagrams illustrating examples of a method of inputting the registered object according to an exemplary embodiment.

Referring to FIG. 14, a user may register simple symbols matched with specific images. The specific images may be images stored in a storage or an external server. Therefore, when a user handwriting-inputs the registered simple symbol, the input simple symbol may be converted into the matched specific image.

For example, referring to FIG. 14A, a star-shaped drawing 141 in which the line segments are not crossed over each other may be matched with the drawing which is more simply expressed, i.e., a star-shaped drawing 142 in which the line segments are crossed over each other. A smiley face drawing 143 may be matched with a face drawing 144 which is more simply expressed.

Similarly, when a user draws and inputs the start-shaped drawing 142 in which the line segments are crossed over each other, the processor 120 may recognize the drawn star-shaped drawing 142, and convert the recognized star-shaped drawing 142 into the matched start-shaped drawing 141 in which the line segments are not crossed over each other.

Further, an external image or drawing 145 expressing a squid may be matched with a more simply expressed squid drawing 146. As illustrated in FIG. 14B, when a user draws and inputs the simply expressed squid drawing 146, the processor 120 may recognize the drawn squid drawing 146, convert the recognized squid drawing 146 into the matched external image or drawing 145, and display the converted image or drawing. Herein, the converted external image or drawing 145 may be automatically scaled to fit the size of the drawn squid drawing 146, and displayed.

The processor 120 may create a text box on the selected edit area, and edit the text box based on the edit unit according to a user command regarding the text box. This will be described in greater detail below with reference to FIGS. 15A to 16.

Figure 15A:
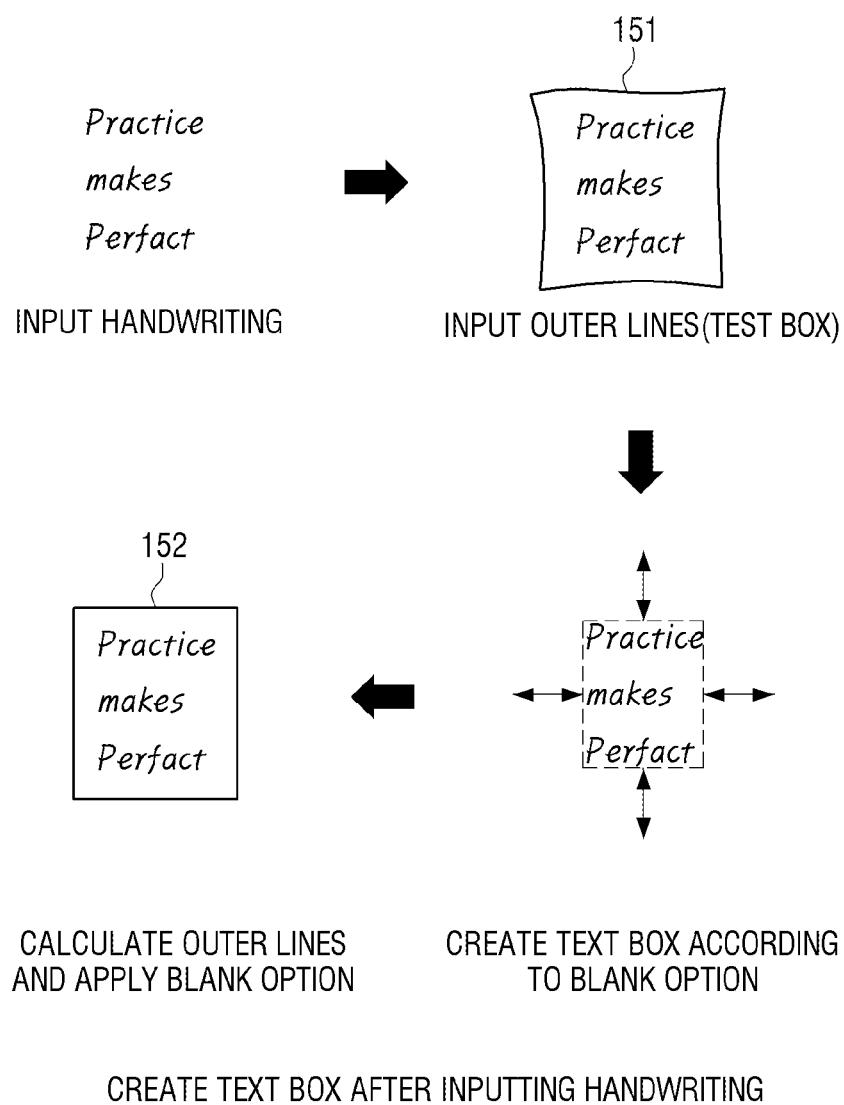
FIGS. 15A-B to 16 are diagrams illustrating examples of a method of creating and editing a text box according to an exemplary embodiment.
Figure 15B:
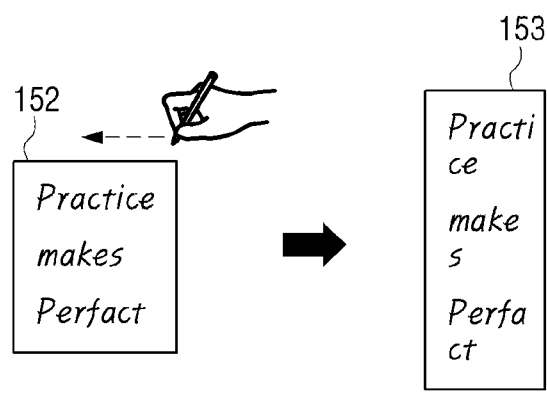
Figure 16:
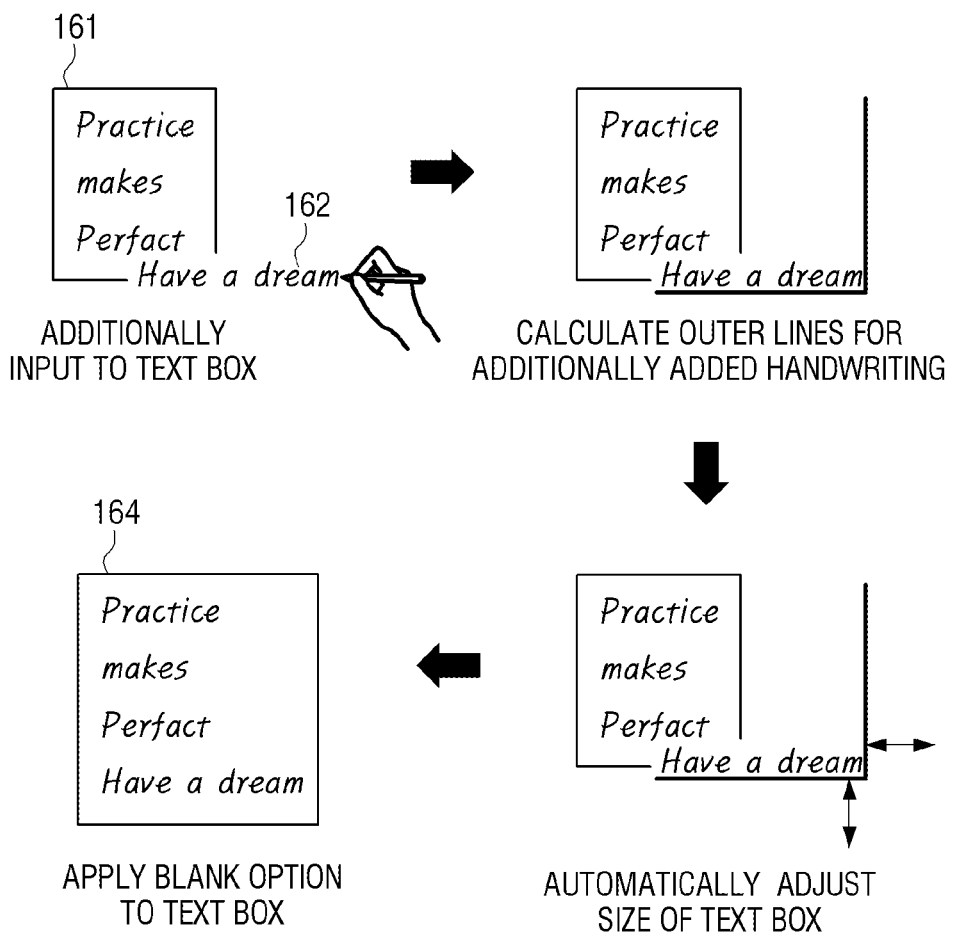

FIGS. 15A to 16 are diagrams illustrating examples of a method of creating and editing the text box according to an exemplary embodiment.

Referring to FIG. 15A, a user may create a text box by drawing lines enclosing the area in which the handwriting is input. For example, when a user draws the outer lines 151 such as square on the area where the handwriting is input, the processor 120 may create a text box 152 by calculating the shape and the blank space of the outer lines and applying the blank option to the outer lines 151. Thus, the processor 120 may apply the blank option so that a blank space is created on the text box 152 corresponding to the MER including the handwriting in the outer lines 151.

Accordingly, the text box 152 and the handwriting included in the text box 152 may be grouped to be one object, which may be moved, rotated and edited. Herein, the outer lines of the text box 152 may be set to be invisible, and the background color of the text box 152 may be also set.

Referring to FIG. 15B, when the size or the shape of the text box 152 is adjusted, the handwriting included in the text box 152 may be rearranged based on the edit unit based on the adjusted size of the text box 152.

For example, the processor 120 may calculate a width of the newly adjusted text box 152, a line-break and rearrange the handwriting based on the edit unit corresponding to the calculated width. Thus, even when the size or the shape of the text box 152 is adjusted, the reduction in the readability of the input handwriting can be minimized.

Further, referring to FIG. 16, when new handwriting 162 is input near to the outer lines of the text box 161 or input to overlap the outer lines, the size of the text box 161 may be adjusted so as to include the new handwriting 162.

For example, as illustrated in FIG. 16, when the new handwriting 162 is input to overlap the outer lines of the text box 161, the processor 120 may calculate a new outer line 163 including the new handwriting 162 in response to the overlapping outer lines, and adjust the size of the text box 161. Herein, the processor 120 may readjust the size of the text box 161 by applying the blank option so that a blank space is created within the text box 161.

Further, when a table create command is input regarding the edit area, the processor 120 may analyze the rows and the columns to divide the handwriting included in the edit area based on the edit unit, and create a table in which the characters included in the edit area are divided based on the rows and the columns based on the analyzed results. The above example will be explained in greater detail below with reference to FIGS. 17 to 20B.

Figure 17:
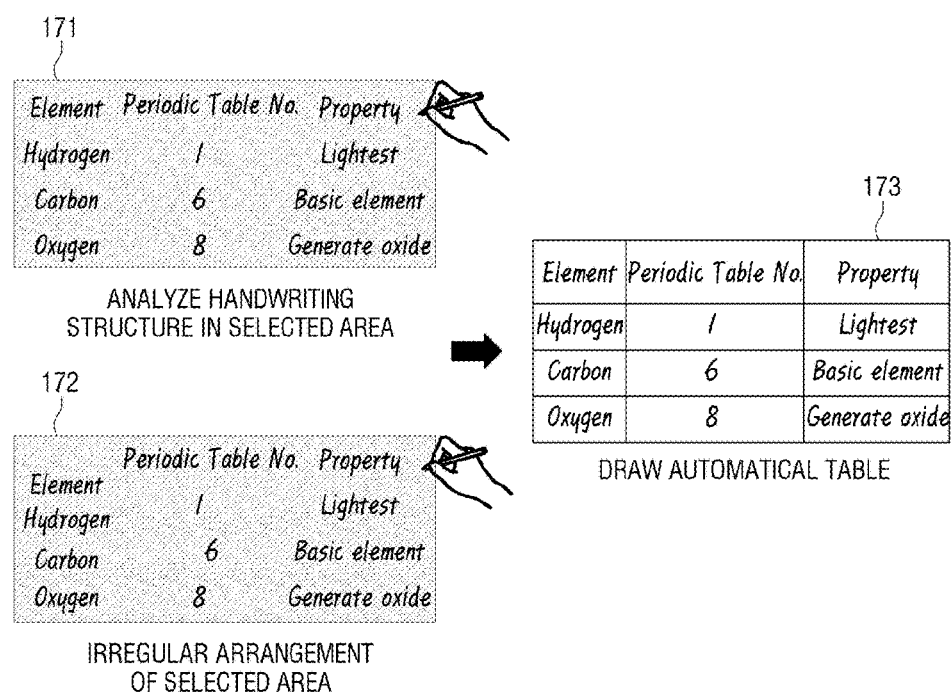
FIGS. 17 and 18 are diagrams illustrating examples of a method of creating a table according to an exemplary embodiment.
Figure 18:
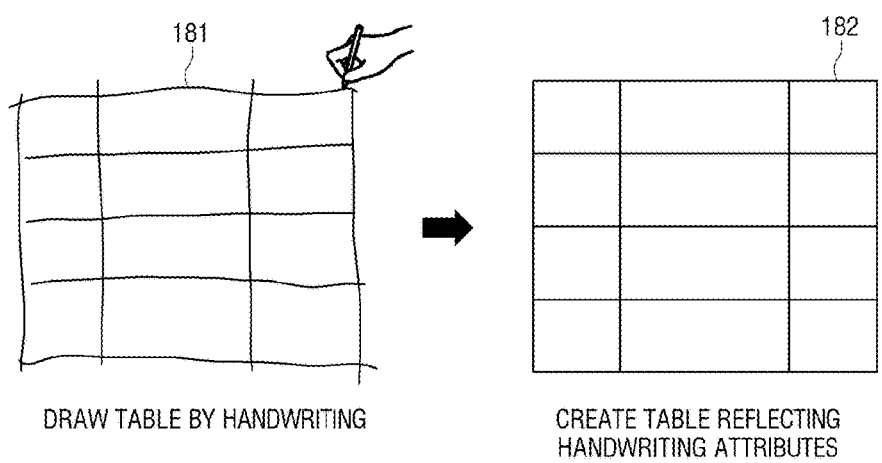

FIGS. 17 and 18 are diagrams illustrating examples of a method of creating a table according to an exemplary embodiment.

Referring to FIG. 17, the processor 120 may create a table 173 by analyzing the structure of the handwriting input within the selected edit area 171 (or the edit area 172) based on the edit unit and the interval between the edit units and dividing the area according to the analyzed results. For example, the processor 120 may determine "Element," "Periodic Table No.," and "Property" to be the words placed on the first same row based on the recognition results regarding the position and the text including the above words. Further, the processor 120 may determine "Hydrogen," "1," and "Lightest" to be the words placed on the second same row based on the recognition results regarding the position and the text including the above words.

Further, the processor 120 may determine "Element," "Hydrogen," "Carbon," and "Oxygen" to be the words placed on the first same column based on the recognition results regarding the text including the above words. Further, the processor 120 may determine "Periodic Table No.," "1," "6," and "8" to be the words placed on the second same column based on the recognition results regarding the text including the above words.

Accordingly, the processor 120 may analyze the rows and the columns of the edit area 171 and create the table 173 in which the handwriting included in the edit area 171 is divided into the same rows and columns based on the analyzed results. Further, when the handwriting within the selected edit area 171 is not input in an orderly manner (e.g., edit area 172), the processor 120 may create the table 173 by rearranging the handwriting to be in order.

Referring to FIG. 18, a user may create a table reflecting the size of the intended cell by directly drawing the table through handwriting inputting. Herein, the processor 120 may substitute the drawn table 181 by extracting features of the drawn table 181, recognizing and creating a corrected basic table 182 corresponding to the extracted features.

FIGS. 19A to 20B are diagrams illustrating examples of a method of editing a table according to an exemplary embodiment.

Figure 19A:
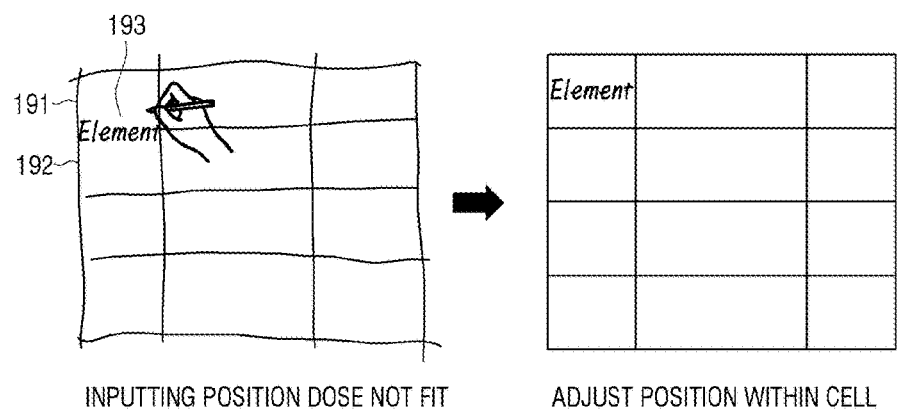

Referring to FIG. 19A, when the handwriting-input word, "Element" 193 does not fit the position of the cell on the drawn table, the processor 120 may automatically adjust the height of the cell according to the height of the input word, or move the input handwriting so that it is included within any one cell of the cells 191, 192 overlapping with the input handwriting. Further, the processor 120 may create a basic table corresponding to the drawn table and substitute the drawn table.

Further, referring to FIG. 19B, if the handwriting input is intended to be added on one cell 194 in the created table, corresponding handwriting 195 may be additionally moved to be included within a corresponding cell 194 when the handwriting 195 is input so as to overlap one outer line of corresponding cell 194. Additionally, the size of the table and the size of the cell constituting the table may be automatically adjusted.

Further, the size of the cell may be adjusted by dragging the outer line of the cell constituting the created table, and new row or new column may be created by drawing a line passing through each cell.

For example, referring to FIG. 19C, when the cell size 196 corresponding to any row or column is uniformly adjusted regarding the created table, the cell size 196 may be adjusted by adjusting the position with a method of dragging a vertical line of corresponding line or column. Additionally, the size of the table and the size of the cell constituting the table may be automatically adjusted.

Figure 20A:
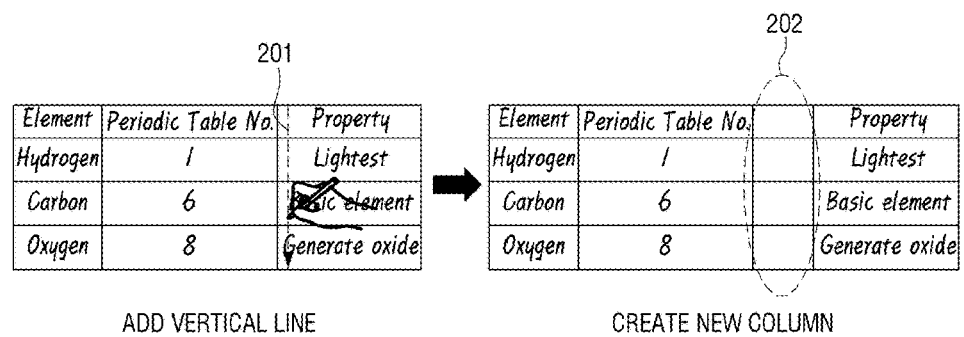

Further, referring to FIG. 20A, when a line 201 passing through the cell of one column is drawn regarding the created table, a new column 202 may be additionally created based on the drawn line 201.

Figure 20B:
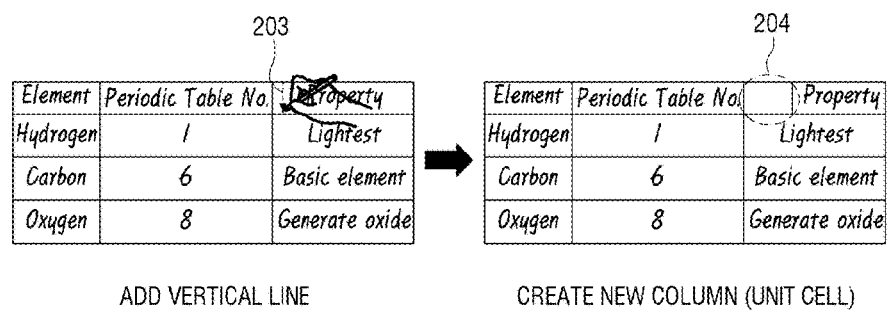

Similar to the above exemplary embodiment, referring to FIG. 20B, when a line 203 dividing one cell is drawn regarding the created table, a new one cell 204 may be additionally created based on the drawn line 203.

Figure 21A:
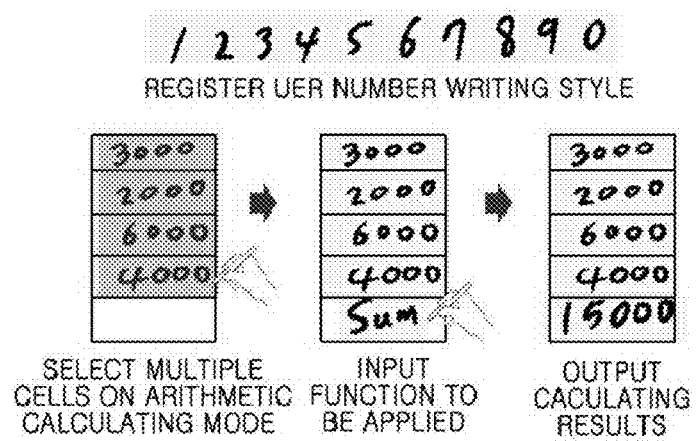
FIGS. 21A and 21B are diagrams illustrating examples of a method of outputting calculation results according to an exemplary embodiment.
Figure 21B:
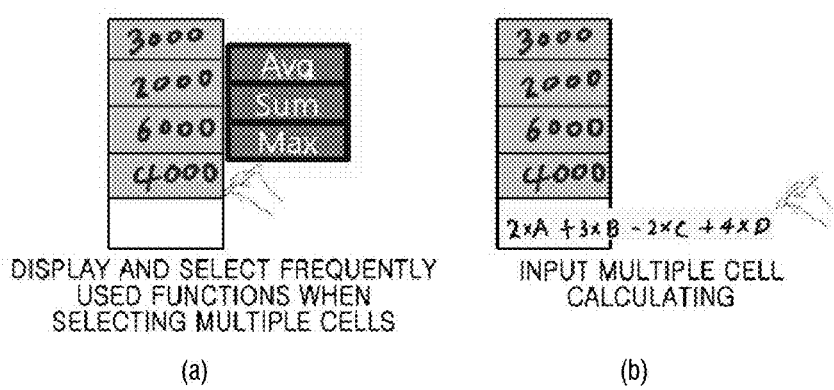

FIGS. 21A and 21B are diagrams illustrating examples of a method of outputting the calculation results according to an exemplary embodiment.

Referring to FIG. 21A, when calculating is intended to be performed by using the numbers handwriting-input on one column or one row of the table, multiple cells to be calculated may be selected, a function may be input to the cell in which the calculation results are outputted, and the calculation results may be outputted.

For example, as illustrated in FIG. 21A, a user may handwriting-input numbers in the first to the fourth cells from the top of the table constituted with the cells of the five rows and one column, select a formula calculation mode, and select the cells from the first to the fourth which will be calculated. Herein, a user may be informed by displaying of the frequently used function list.

Thereafter, when a command "Sum" to sum up all the handwriting-input numbers is handwriting-input on the last fifth cell, the calculation results may be outputted on the fifth cell.

In the above example, a user may previously register the number writing style, and the calculation results may be outputted with the registered number writing style.

Referring to illustration (a) of FIG. 21B, when a user selects multiple cells, the frequent used function list may be displayed near to the multiple cells, and a user may select one on the frequent used function list.

Further, referring to illustration (b) of FIG. 21B, the calculation results based on corresponding formula may be outputted by inputting the formula regarding the selected multiple cells on the fifth cell from the top. Herein, corresponding formula may be input outside the cell area.

Referring to illustration (b) of FIG. 21B, letters "A", "B", "C", and "D" indicate the position per cell from the top. That is, "A", "B", "C", and "D" correspond to the handwriting-input numbers on the first cell, the second cell, the third cell, the fourth cell, respectively.

Figure 22:
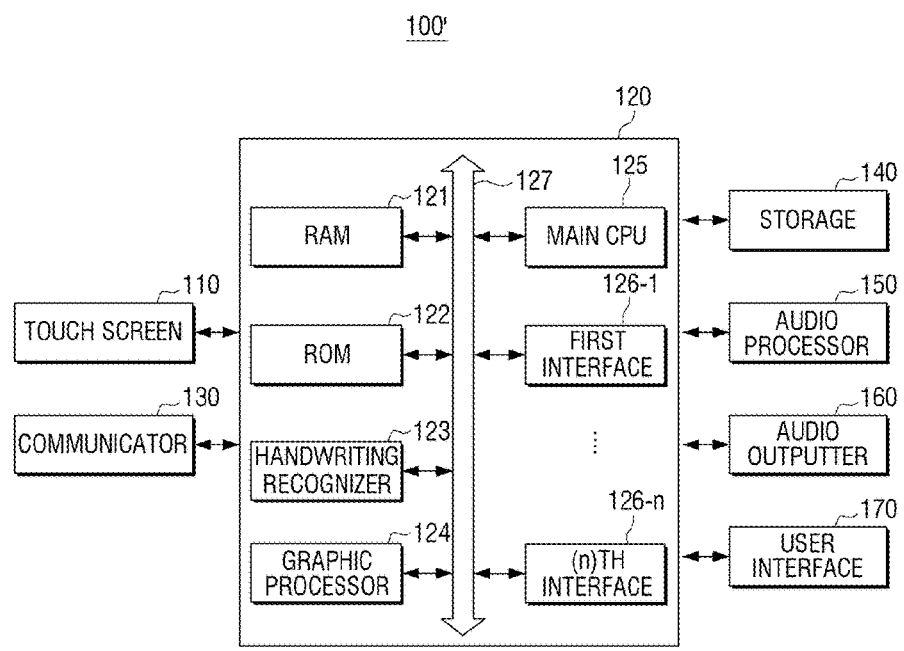
FIG. 22 is a detailed block diagram of the handwriting input apparatus according to another exemplary embodiment.

FIG. 22 is a detailed block diagram of a display apparatus constituting the handwriting input apparatus according to an exemplary embodiment. Referring to FIG. 22, the handwriting input apparatus 100' according to another exemplary embodiment includes a touch screen 110, a processor 120, a communicator 130, a storage 140, an audio processor 150, an audio outputter 160, and a user interface 170. In the following description, those overlapping with the descriptions regarding FIG. 1 will not be redundantly explained.

The communicator 130 is configured to perform communication with an external device. The communicator 130 may perform communication with an external device through various communication methods such as BT (BlueTooth), Wi-Fi (Wireless Fidelity), Zigbee, IR (Infrared), NFC (Near Field Communication), and the like.

The storage 140 is configured to store various modules to drive the handwriting input apparatus 100'.

For example, the storage 140 may store a base module to process signals delivered from each hardware included in the handwriting input apparatus 100', a storage module to manage the database (DB) or the registry, a security module, and a communication module. The storage 140 may also store a handwriting recognition module to extract feature points regarding the input handwriting and recognize the handwriting.

The audio processor 150 is configured to perform the processing of audio data.

The audio outputter 160 is configured to output audio signals. The audio outputter 160 may include a receiver component and a speaker.

The user interface 170 is configured to sense user interaction to control overall operation of the handwriting input apparatus 100'.

The processor 120 may control overall operation of the handwriting input apparatus 100' by using the various modules stored in the storage 140. The processor 120 may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions.

Referring to FIG. 22, the processor 120 may include RAM 121, ROM 122, a handwriting recognizer 123, a graphic processor 124, a main CPU 125, a first to an n-th interfaces 126-1~126-n, and a bus 127. Herein, RAM 121, ROM 122, the handwriting recognizer 123, the graphic processor 124, the main CPU 125, and the first to the n interfaces 126-1~126-n may be connected to each other through the bus 127.

ROM 121 may store a set of commands for the system booting. The main CPU 125 may copy the various application programs stored in the storage 140 to RAM 121, and perform various operations by implementing the copied application programs in RAM 121.

The handwriting recognizer 123 may recognize the handwriting input through the touch screen 110 as text by using the handwriting recognition module and character feature information stored in the storage 140. For example, the handwriting recognizer 123 may form displacement signals moving on a certain trajectory following the movement of the finger or the electronic pen into the character data in a specific pattern, extract the character feature information uniform to the formed character data in a specific pattern from the storage 140, and recognize the characters through the character converting algorithms.

The graphic processor 124 may generate a screen including various objects such as icons, images, and texts by using a calculator (not illustrated) and a renderer (not illustrated). The calculator may calculate feature values such as coordinate values, shapes, sizes, and colors in which the objects will be respectively displayed according to the layout of the screen. The renderer may generate various layouts of the screen including objects based on the feature values calculated in the calculator.

The main CPU 125 may access the storage 140, and perform the booting by using the stored operating system (O/S) in the storage 140. Further, the main CPU 125 may perform various operations by using the various programs, contents, and data stored in the storage 140. Specifically, the main CPU 125 may control the handwriting recognition of the handwriting recognizer 123 by using the handwriting recognition module stored in the storage 140.

The first to the n-th interfaces 126-1~126-n may be connected with the above various components. One of the interfaces may be a network interface connected to an external device through network.

Figure 23:
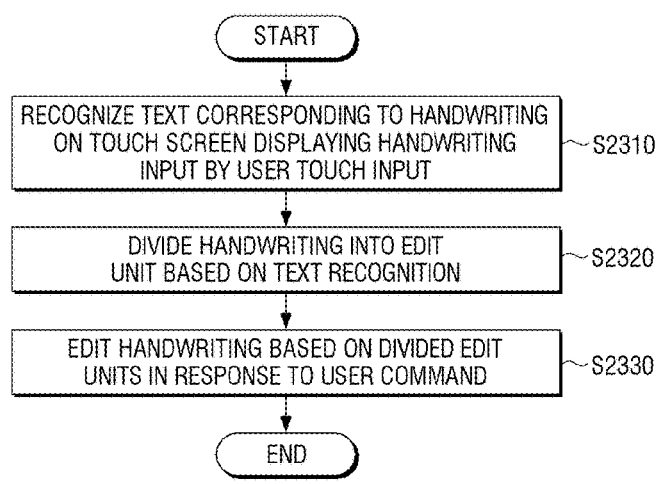
FIG. 23 is a flowchart illustrating an example of a control method of a handwriting input apparatus according to an exemplary embodiment.

FIG. 23 is a flowchart illustrating an example of a control method of the handwriting input apparatus according to an exemplary embodiment.

At S2310, text corresponding to the handwriting may be recognized on the touch screen displaying the handwriting input by to a user touch input.

At S2320, the handwriting may be divided based on the edit unit based on the text recognition. As described above, the edit unit may be one character or one word.

At S2330, editing of the handwriting may be performed based on the divided edit units in response to the user command. For example, when the user command is to select at least one area from among the areas where the handwriting is performed, the edit area may be selected by dividing the handwriting included in the selected area based on the edit unit. Further, when a size change command to change the size of the handwriting included in the edit area is input, the size of the handwriting may be determined based on the edit unit and adjusted based on the edit unit corresponding to the size change command. Further, when a line interval change command to change the line interval between the handwriting included in the edit area is input, the line interval between the handwriting may be determined based on the edit unit and adjusted based on the edit unit corresponding to the line interval change command.

Further, the operation of performing the editing may substitute the edit area with the new handwriting when new handwriting is input regarding the edit area, and rearrange the area where the handwriting is performed based on the edit unit based on the substituted handwriting.

According to the above various exemplary embodiments, the user convenience can be enhanced because the user can write and edit the documents through handwriting inputting, while still maintaining user experiences regarding keyboard-based document writing and editing.

The control method of the handwriting input apparatus according to the above various exemplary embodiments may be implemented as a program, which may be stored in various recording medium. Thus, the computer program that can perform the above various control methods with the processing of various processors may be stored and used in recording medium.

For example, a non-transitory computer readable recording medium storing a program, in which the program includes steps of recognizing a text corresponding to the handwriting input by to a user touch input, dividing the handwriting based on the edit unit based on the text recognition, and performing the editing regarding the handwriting based on the divided edit units in response to a user command, may be provided.

The non-transitory computer readable recording medium may be any data storage device that is capable of storing the software or instructions and any associated data, data files, and data structures so that they can be read by a computer system or processing device. Examples of a non-transitory computer readable medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative only, and not to limit the scope of the claims.

What is claimed is:

1. An apparatus for controlling handwriting, comprising a touch screen and a processor configured to:
   control the touch screen to display a handwriting input by a touch,
   recognize a text corresponding to the handwriting,
   divide the handwriting into a plurality of handwriting segments based on the recognized text and a predetermined edit unit,
   in response to receiving a touch to select a portion of an area in which the handwriting is displayed, select one or more handwriting segments corresponding to the selected portion from among the plurality of handwriting segments, and
   in response to receiving a new handwriting input by a touch being overwritten on the selected one or more handwriting segments, substitute the new handwriting for the selected one or more handwriting segments of the displayed handwriting, and rearrange the area in which the handwriting is displayed based on the predetermined edit unit and the substituted new handwriting.

2. The apparatus of claim 1, wherein, based on the selected one or more handwriting segments consisting of at least two lines of handwriting segments, in response to receiving a line interval change command to change a line interval of the selected one or more handwriting segments through the touch screen, the processor is further configured to adjust the line interval of the selected one or more handwriting segments to a line interval according to the line interval change command.

3. The apparatus of claim 1, wherein, in response to receiving a handwriting move command to move a position of the selected one or more handwriting segments to another area in the area in which another handwriting segment is displayed, the processor is further configured to move the position of the selected one or more handwriting segments according to the handwriting move command, and rearrange an order of the handwriting in the area in which the handwriting is displayed based on the predetermined edit unit and the moved position of the selected one or more handwriting segments.

4. The apparatus of claim 1, wherein the processor is further configured to create a text box on the selected one or more handwriting segments, and edit the text box based on the predetermined edit unit, in response to receiving a touch corresponding to the text box.

5. The apparatus of claim 1, wherein, in response to receiving a table create command corresponding to the selected one or more handwriting segments, the processor is further configured to analyze rows and columns to divide the selected one or more handwriting segments by the predetermined edit unit and create a table in which the selected one or more handwriting segments is divided into the rows and the columns based on results of the analyzing.

6. The apparatus of claim 1, wherein, in response to receiving a touch to adjust a size of an input window in which the handwriting is displayed, the processor is further configured to rearrange the handwriting based on the predetermined edit unit and the adjusted size of the input window.

7. The apparatus of claim 1, wherein the predetermined edit unit is one character or one word of text.

8. A control method of an apparatus for controlling handwriting, comprising:
   recognizing a text corresponding to handwriting input by a touch and displayed on a touch screen;
   dividing the handwriting into a plurality of handwriting segments based on the recognized text and a predetermined edit unit;
   in response to receiving a touch to select a portion of an area in which the handwriting is displayed, selecting one or more handwriting segments from among the plurality of handwriting segments; and
   in response to a new handwriting input by a touch being ovewritten on the selected one or more handwriting segments, substituting the new handwriting for the selected one or more handwriting segments of the handwriting displayed on the touch screen, and rearranging the area in which the handwriting is displayed based on the predetermined edit unit and the substituted handwriting.

9. The control method of claim 8, wherein, based on the selected one or more handwriting segments consisting of at least two lines of handwriting segments, in response to receiving a line interval change command to change a line interval of the selected one or more handwriting segments through the touch screen, the control method further comprises adjusting the line interval of the selected one or more handwriting segments to a line interval according to the line interval change command.

10. The control method of claim 8, wherein, in response to receiving a touch to move a position of the selected one or more handwriting segments to another area in the area in which another handwriting segment is displayed, the control method further comprises moving the position of the selected one or more handwriting segments according to the touch to move the position of the selected one or more handwriting segments, and rearranging an order of the handwriting in the area in which the handwriting is displayed based on the predetermined edit unit and the moved position of the selected one or more handwriting segments.

11. A device comprising a display and at least one processor configured to:
   control the display to display a handwriting drawn by a touch,
   perform text recognition on the handwriting to determine a text corresponding to the handwriting,
   segment the handwriting into a plurality of handwriting segments based on the determined text and a selected segment size of a plurality of predetermined segment sizes,
   in response to receiving a touch to select a portion of an area in which the handwriting is displayed, select one or more handwriting segments corresponding the selected portion from among the plurality of handwriting segments,
   in response to a new handwriting drawn by a touch being ovewritten on the selected one or more handwriting segments, substituting the new handwriting for the selected one or more handwriting segments of the displayed handwriting, and rearranging the area in which the handwriting is displayed based on the selected segment size and the substituted handwriting.

12. The device of claim 11, wherein the at least one processor is further configured to change a line interval of the selected one or more handwriting segments, in response to receiving a change of line interval command input by a touch.

13. The device of claim 11, wherein the plurality of predetermined segment sizes comprise a size corresponding to one letter of text and a size corresponding to one character of text.

14. The apparatus of claim 1, wherein the selected one or more handwriting segments are adjusted to a size selected by a user.

* * * * *